(12) United States Patent
Posner et al.

(10) Patent No.: US 7,243,801 B2
(45) Date of Patent: Jul. 17, 2007

(54) SYSTEM FOR REMOVING PLASTIC FROM RECYCLED MATERIAL

(75) Inventors: Oren R. Posner, Eugene, OR (US); Susan C. Posner, Eugene, OR (US); Bill Jones, Eugene, OR (US)

(73) Assignee: Hawker Corporation, Eugene, OR (US)

( * ) Notice: Subject to any disclaimer, the term of this patent is extended or adjusted under 35 U.S.C. 154(b) by 205 days.

(21) Appl. No.: 10/992,957

(22) Filed: Nov. 18, 2004

(65) Prior Publication Data

US 2006/0102450 A1   May 18, 2006

(51) Int. Cl.
*B07C 5/00* (2006.01)

(52) U.S. Cl. ............ 209/643; 209/645; 209/308; 198/818; 406/113

(58) Field of Classification Search .......... 209/643, 209/645, 308; 406/77, 79, 80, 113; 198/811, 198/813, 818, 955
See application file for complete search history.

(56) References Cited

U.S. PATENT DOCUMENTS 4,186,836 A * 2/1980 Wassmer et al. ............ 209/565
4,475,848 A * 10/1984 Truninger ................... 406/115
4,737,270 A * 4/1988 Phelps ........................ 209/138
5,033,251 A * 7/1991 Rodriguez ..................... 53/54
5,242,059 A * 9/1993 Low et al. .................. 209/552
6,375,011 B1 * 4/2002 Flottmann et al. .......... 209/261
6,397,678 B1 * 6/2002 Popper ........................ 73/580
6,427,845 B1 * 8/2002 Buer .......................... 209/643

* cited by examiner

*Primary Examiner*—Douglas A. Hess
(74) *Attorney, Agent, or Firm*—Schwabe, Williamson & Wyatt, P.C.

(57) ABSTRACT

A system for separating pieces of plastic bag from ground yard debris and the like, e.g., asphalt shingles. A conveyor conveys the debris material along a conveyor path and an agitator bounces the conveyor to cause the lighter plastic to reposition to the top of the material on the conveyor. A suction tube end is positioned over the debris material following agitation to draw the plastic off the top of the material. The tube end is selectively adjustable to enable discriminate suction effect to draw off a maximum amount of plastic and a minimal amount of nonplastic recyclable debris.

9 Claims, 3 Drawing Sheets

SYSTEM FOR REMOVING PLASTIC FROM RECYCLED MATERIAL

FIELD OF THE INVENTION

This invention relates to a system that removes plastic from recycled materials and more particularly the removal of pieces of plastic film resulting from shredding of plastic bags, e.g., during a recycling of yard debris.

BACKGROUND OF INVENTION

It is common practice for communities to provide for recycling of yard debris such as grass, weeds, bush trimmings, tree branches and so on. These materials are collected e.g. from home owners, shredded, screened and redistributed e.g. as ground cover, rather than filling in-ground disposal sites. However, a constant problem with this recycling process is the presence of plastic film among the yard debris. This is believed due to the practice of homeowners collecting yard debris in large plastic bags and dumping the bags filled with the yard debris into designated recycling bins. Plastic bags get shredded and screened with the yard debris and if not removed gets deposited with the yard debris for redistribution as ground cover. Such plastic is detrimental for such use and it is desirable if not essential that the plastic be removed from the yard debris as feasible. Prior to the present invention, the ground up yard debris was conveyed through an extensive hood-like enclosure wherein upwardly directed air movement separated out a major portion of the lighter plastic material. The lighter plastic is drawn away from the heavier yard debris materials and suctioned off through a duct and to a disposal receptacle while the heavier yard debris is separately conveyed out of the hood to be collected and recycled. Such separation involves a substantial expenditure and an object of the present invention is to accomplish such removal of plastic at reduced cost.

BRIEF DESCRIPTION OF THE INVENTION

A problem with the procedure currently in use for separating out the plastic, is the dependency on relative mass as between the plastic and the various types of yard debris. It is perhaps unavoidable that the air suction draw for removing the plastic also draws off a portion of the otherwise quite acceptable yard debris material. The undesirable factor is exaggerated by the desired objective to remove, e.g. in the order of 80% of the plastic. The different types of debris and the different condition of the debris being subjected to the separation process e.g. wet versus dry, mostly wood versus mostly leaves, etc., dictates that the suction process be set at a rate that ensures plastic removal under worst case conditions. Such criteria results in a high volume of separated and removal of a quantity of the lighter yard debris along with the desired plastic.

As previously discussed, the existing process and machinery therefore is also undesirably expensive and both these issues are addressed by the present invention.

In a preferred embodiment of the present invention, the yard debris with plastic film i.e. plastic bags, is ground and screened. The overs of the screening process, which includes the major portions of the plastic, is conveyed from the screen to a collection point via a belt conveyor e.g. a trough-type belt conveyor. A flexible hose e.g. 10 inches in diameter is connected at one end to a suction fan and the other end is positioned with the open end overlying the conveyor belt. This latter end is mounted so as to be adjustable relative to the material being conveyed on the conveyor belt e.g. between 6 and 12 inches over the material.

Just prior to the point where the material on the belt passes under the vacuum hose end e.g. a couple of feet prior, the material is agitated e.g. using a roller or rotor with slats or flutes that rapidly bumps the bottom of the belt and bounces the material conveyed on the top of the belt. Because the plastic is lighter than the vegetation material being conveyed, it rises to the top and is most susceptible to the overlying vacuum. The drawing and vacuuming effect from the material of the belt underlying the hose end is determined by the air flow through the tube and the spacing of the hose end from the material on the belt. The top most material i.e. the closest to the tube end, is thus most effected.

An operator stationed at the open end of the tube overlying the belt can view the effect of the suction and adjust the spacing of the tube end. The operator thus is able to maintain a delicate balance as between allowing too much plastic to cross the tube end (the tube end needs to be lowered) and having too much of the vegetation drawn into the tube end (the tube end needs to be raised).

The invention as briefly described will be more fully understood and appreciated upon reference to the following detailed description having reference to the accompanying drawings.

DETAILED DESCRIPTION

Figure 1:
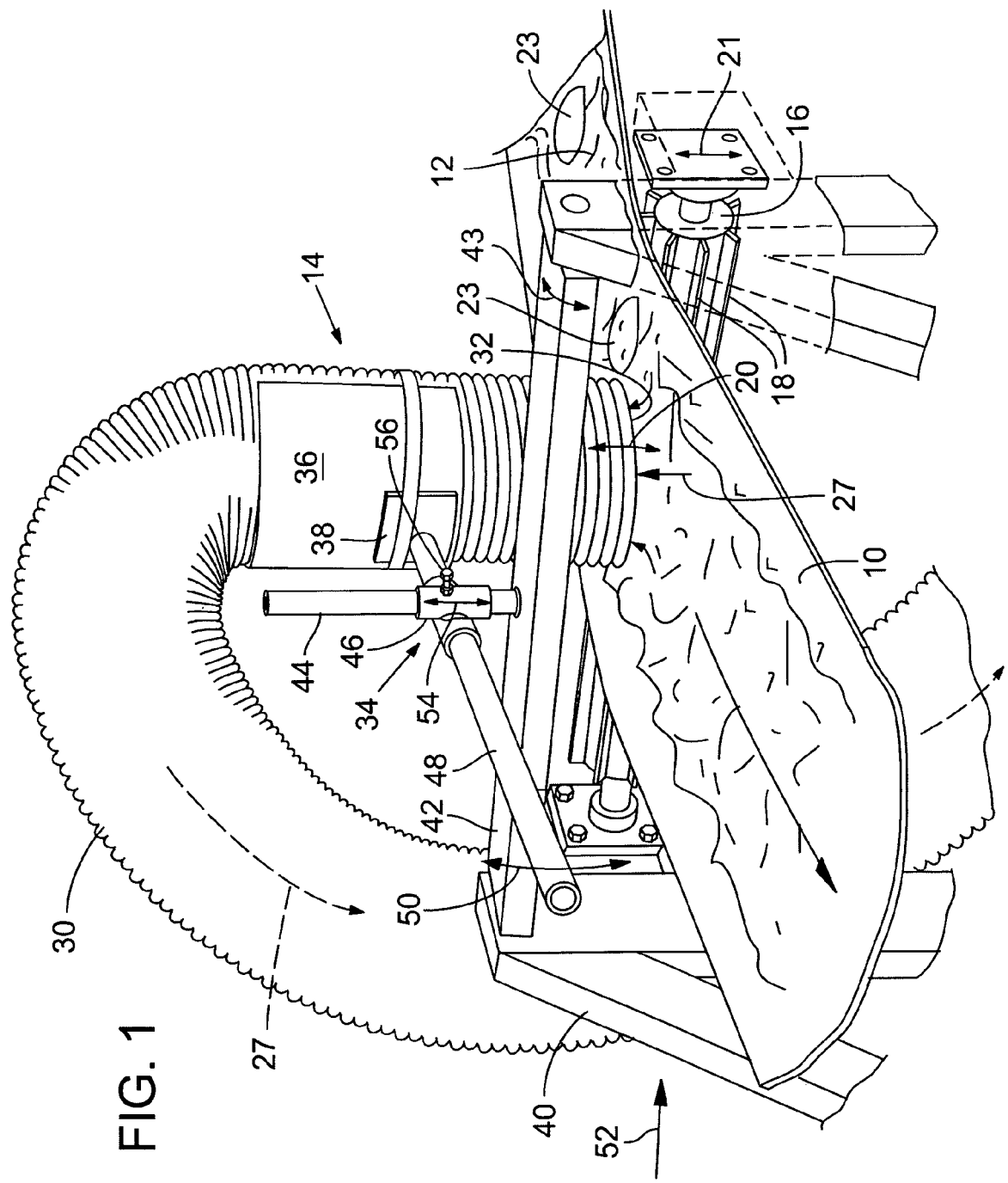
FIG. 1 is a perspective view of a plastic removal apparatus in accordance with the present invention.
Figure 2:
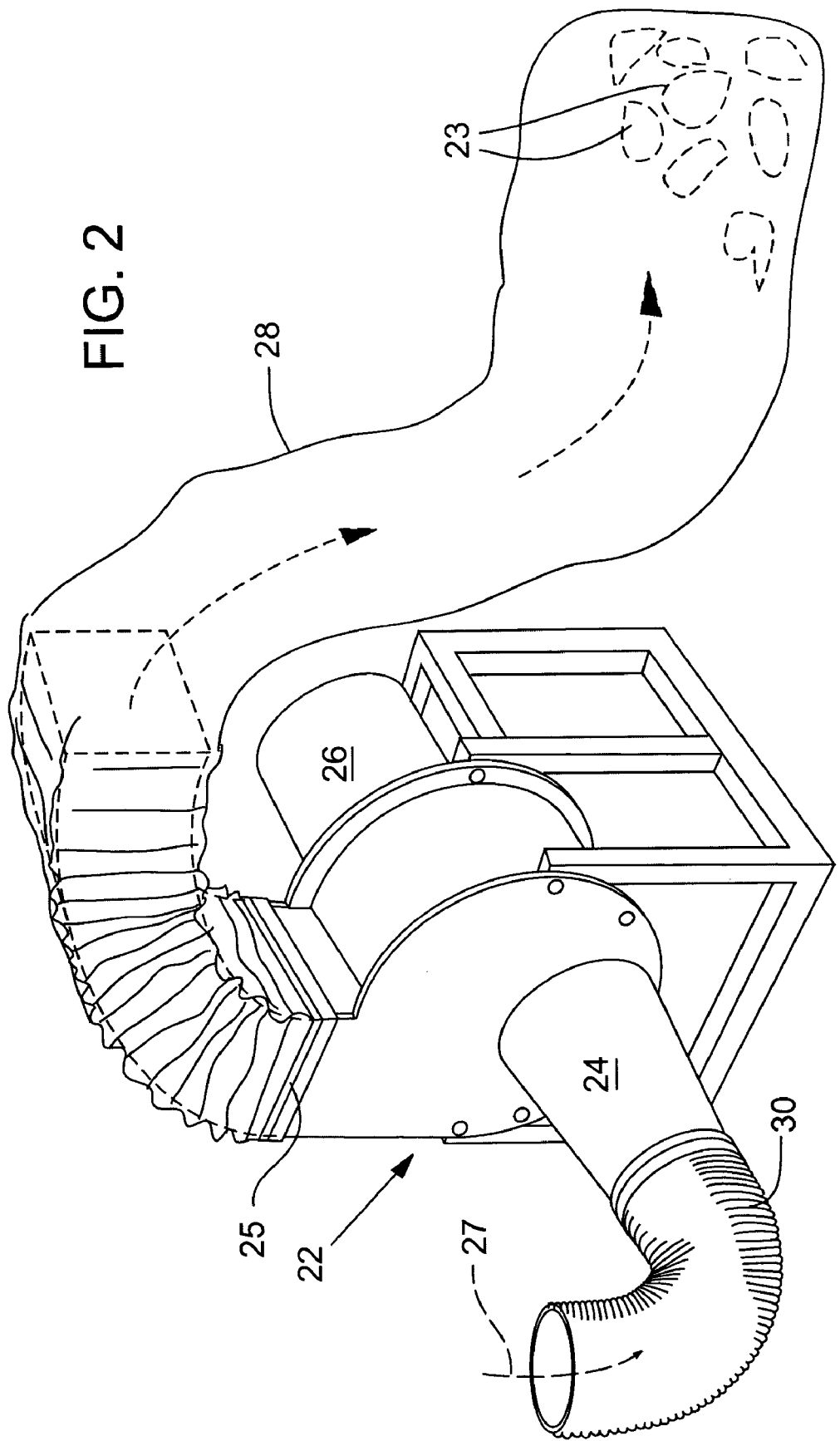
FIG. 2 is a perspective view of a suction producing apparatus forming part of the apparatus of FIG. 1.

FIGS. 1 and 2 illustrate an embodiment of the invention. FIG. 1 shows a trough-type conveyor belt 10 conveying ground up yard debris 12. The yard debris 12 typically has been through prior processing step(s) including a grinding process that e.g. reduces tree limbs and the like to chunks of vegetation referred to herein sometimes as bark chips. The bark chips have further been separated into size categories by screening which typically includes placing the bark chips on one end of an inclined vibrating screen where small bark chips pass through the screen and the larger size chips are vibrated along the screen length and deposited off the screen end. This latter debris-type is referred to as bark chip overs or simply as overs. Plastic bags that have been shredded by the prior grinding operation are largely contained in the bark chips' overs. It is the bark chip overs with plastic pieces that make up the material 12 of FIG. 1 and the operation of the apparatus of FIGS. 1 and 2 is intended for the removal of such plastic from the bark chip overs.

In FIG. 1, placed under the trough belt 10 just prior to a removal apparatus, generally indicated by reference arrow 14, is an agitation rotor 16. The rotor 16 includes bumper flutes 18 which engage the underside of the conveyor belt 10. The rotor 16 is adjustable up and down as indicated by adjustment arrows 21. Thus, the flutes 18 are adjusted into greater or lesser contact with the underside of the belt 10 and as the belt is driven, the belt engages the flutes to rotate the rotor and in the process causing bumping-type agitation of the material 12 being conveyed by the belt 10. This agitation induces rearrangement of the material 12, the lighter portions tending to somewhat float to the top and the heavier material gravitating to the bottom. Plastic being lighter in weight tends to rise to the top and is set up for removal by a suction hose which will now be explained.

Reference is made to FIG. 2 where a conventional suction fan 22 is illustrated. Air is sucked into the fan 22 via an inlet nozzle 24 and out of the fan via outlet nozzle 26. Any debris contained in the air is screened and deposited in a removable/replaceable debris bag 28. Connected to the inlet nozzle 24 is a flexible tube 30.

The same flexible tube 30 is shown in FIG. 1 and as shown extends from the fan 22 up and over the conveyor belt 12 with the open end 32 facing downward and positioned in spaced relation over material 12 being conveyed on the conveyor belt 10. The tube end is held in place over the conveyor belt by an adjustable holder 34. The holder 34 includes a sleeve portion 36 strapped onto a positioning shoe 38. A fixed support 40 includes a cross bar 42. A vertical pipe 44 fixed to the cross bar 42 slidably supports a pivotal dual stemmed bracket 46. A tubular handle 48 extends through a second stem of the bracket 46 and one end of the handle is connected to shoe 38. It will be observed that pivotal movement of the handle 48, as indicated by arrow 50, generates raising and lowering of shoe 38 secured to the tube 30 and thereby raises and lowers tube end 32 in spaced relation to material 12 on conveyor belt 10. Note that the connection between the shoe 38 and handle 48 may be pivotal to accommodate the angular shift of the handle and maintain a vertical orientation of the tube end.

OPERATION

There are a number of factors which effect the process of vacuum separation of the plastic and bark. Certain of the bark may be heavier or lighter e.g. due to size and/or moisture content and/or height of material 12 on the belt, and similar variables may apply to the plastic. Thus, a particular setting of the spaced relationship of the tube end 32 over the material 12 (or belt 10) will not produce the same results over any length of time. To accommodate such variables and so as to improve separation, the height of the tube end 32 can be varied and thereby increasing the suction (lowering the tube end 32) or decreasing the suction (raising the tube end 32).

A determination of the satisfactory separation of bark material from plastic can be observed by an operator represented by arrow 52. He can observe how much bark is being sucked into tube end 32 and how much plastic remains on the material as it passes tube end 32. He can readily adjust the height of the tube end to increase or decrease the suctional effect on material 12. The operator may also determine that the agitation is too great or too little and adjust the height of the rotor 16 (arrows 21). A further adjustment is available by moving the bracket 46 up or down on the vertical pipe 44 by unlocking and relocking lock screw 56 as indicated by arrow 54.

It may be desirable to have a second or greater number of the removal stations of the type illustrated and described above, the stations spaced along the reach of the conveyor belt. Further, the raising and lowering of the tube end 32 may be accomplished by the use of motors and sensors to reduced dependency on operator manipulation. It has been observed that often the bark material is heated and gives off steam as it is conveyed under the tube end 32 and one can observe the effect of the vacuum by noting the extent to which that steam is drawn into the tube end. The spacing of the tube end is generally sufficiently above the material 12 to allow for a funnel-like suction draw on the material allowing for a greater width of the material 12 on the belt than the diameter of the tube end.

Figure 3:
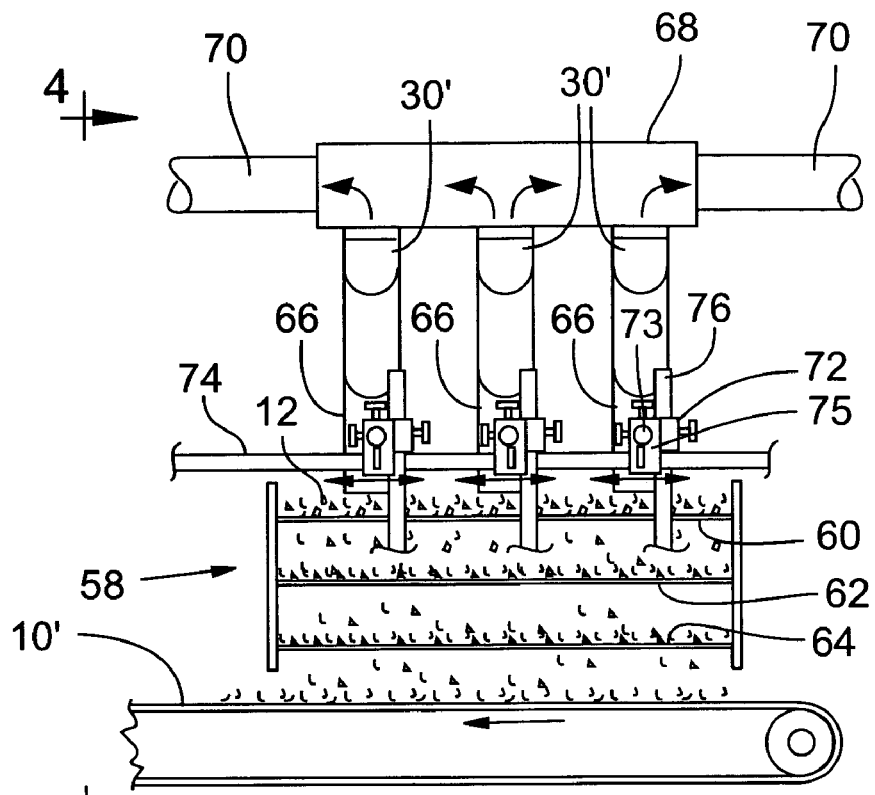
FIGS. 3 and 4 are front and side views of an alternate embodiment.
Figure 4:
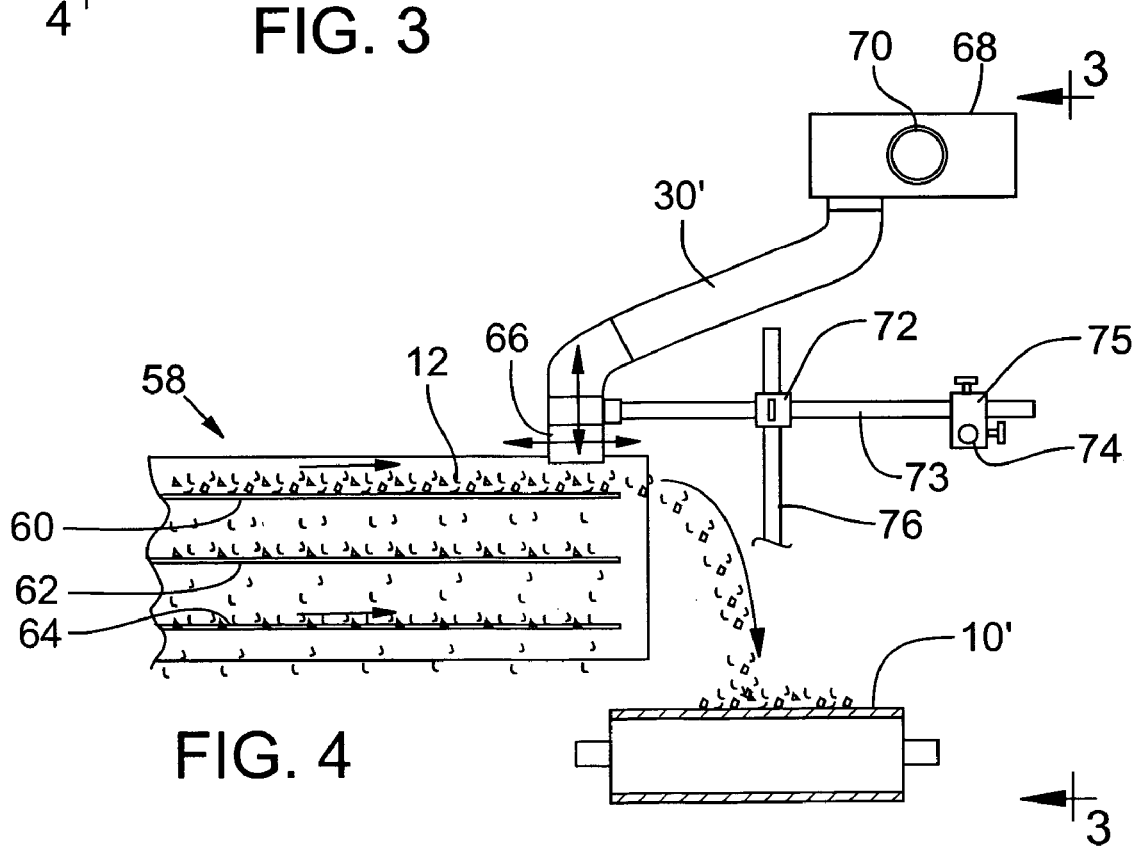

An alternate embodiment is illustrated in FIGS. 3 and 4. In this alternate embodiment, the suction station is provided at the end of a screen 58. Such a screen is referred to at the outset of the brief description of the invention and as explained provides for the overs being transferred off the end of the screen and onto a troughed conveyor belt, e.g. conveyor belt 10.

It is recognized, however, that the screen itself is a form of conveyor that typically relies on vibration/agitation of the materials to induce movement of the materials along the screen while performing a separating action of those materials. Yard debris is placed on the input end of an upper screen deck and, by vibration/agitation, moves the debris along the length of the screen. Smaller size material passes down through the screen openings and onto lower screen decks having smaller screen sizes which repeat the separating process. Material on the upper deck that does not pass through the upper screen (the overs) gets moved by vibration/agitation along the deck to the output end of the deck and transferred off the screen and onto a conveyor, e.g. a conveyor 10.

It is further recognized that the vibration applied for facilitating movement of the debris also performs the operation of bouncing the lighter materials to the top of the debris pile on the screen. Accordingly, the position of a vacuum tube or tubes 32 at the exit end of the overs screen deck will perform the desired suctioning off of the lighter plastic materials.

With reference to the schematic illustrations of FIGS. 3 and 4, item 58 is a vibrating screen with multiple screen decks 60, 62, 64. The upper screen deck, e.g. 60, carries the "overs" material 12. That is, the openings through the screen decks diminish in size to separate input material by size. The larger size screen at or near the top (upper screen deck 60 in FIGS. 3 and 4) has screen openings of a size that will retain the larger material, e.g. bark chips and plastic pieces (overs material 12). These are typically vibrated off the end of the screen 60 and onto a conveyor belt 10'.

In this embodiment of the invention and primarily because the screen deck 60 is substantially wider than the typical trough belt 10, multiple tubes 30' are provided, each connected to a manifold 68 and each fitted with a suction nozzle 66. Suction is provided to the manifold via suction hoses 70 which in turn are connected to e.g. a fan or fans 22. (See FIG. 2.)

FIGS. 3 and 4 further illustrate the manner of manual adjustment closer to and farther from the material 12 on the output end of the screen deck 60. As illustrated, each suction nozzle 66 is secured to a tubular handle 73 that is connected to a holder 72 similar to holder 34 of the prior embodiment. The three holders 72 are mounted on vertical pipes 76. The handles 73 are projected through holder 72 and then tied to cross bar 74 via holder 75. Raising and lowering of cross bar 74 simultaneously lowers and raises the three nozzles 66. Individually, each nozzle 66 can be adjusted relative to each other as provided by adjustment of holders 72 relative to vertical pipes 76. Alternatively, the suction nozzles need not be tied together and each nozzle adjusted manually via raising and lowering of bar 73, i.e., cross bar 74 being eliminated.

The above descriptions are intended as preferred embodiments of the invention and there are numerous modifications/variations that will become obvious to those skilled in the art. An example is found in the practice of recycling asphalt shingles which are ground into chunks and used for paving, e.g. roads. Again, plastic is a problem and the invention can be used to separate the plastic from the ground up asphalt chunks. It is therefore to be understood that the invention as claimed is not limited to any particular embodiment or particular features of the embodiments illustrated. Accordingly, the claim terms are intended to have a broad meaning and to be interpreted in accordance with common understanding of those terms as used in the art.

The invention claimed is:

1. A system for removing undesirable material from recyclable material comprising:
   a conveyor belt for conveying recyclable material of reduced size and including pieces of undesirable material;
   a suction tube having an open end adapted to direct a substantially continuous suction substantially across a width of the recyclable material which open end overlies the recyclable material being conveyed at a desired position above the conveyor depending on the material being conveyed; and
   an agitating mechanism located below the recyclable material for agitating the material conveyed on the conveyor belt at a position prior to the position of the open end of the tube wherein the agitating mechanism is a rotor having radially projecting members, said rotors positioned under the belt and the projecting members engaging the belt during rotation for repetitively bouncing material conveyed on the belt to cause lighter material to become positioned on the top of the material being conveyed.

2. A system as defined in claim 1 wherein the rotor is vertically adjustable to varying degrees of engagement with the belt.

3. A system as defined in claim 1 including a mounting for adjustably mounting the open end of the tube in spaced relation above the conveyor belt and accordingly above materials conveyed on the conveyor belt;
   said mounting provided with an adjustment for selectively adjusting the position of the open end of the tube over the conveyor belt and thus over the material being conveyed by the conveyor belt; and
   wherein the conveyor belt is a trough-type conveyor belt adapted to convey material that is preground and/or prescreened to provide screen overs of recyclable material including pieces of plastic material and said adjustment is provided for manual adjustment by an operator visually observing the suction effect of the suction tube on the material being conveyed by the conveyor belt.

4. A system as defined in claim 1 wherein the elongate conveyor is a debris materials separating screen, including a screen deck having inlet and exit ends that conveys the overs of the debris material via agitation toward and over the exit end; and
   the suction tube with open end positioned over said exit end.

5. A system as defined in claim 4 wherein multiple suction tubes with open ends are provided laterally over the screen end.

6. A system as defined in claim 5 wherein the open end of the suction tubes are connected to a common positioning lever for simultaneous raising and lowering of the multiple open ends.

7. A process for removing undesirable material from the overs of preground and/or prescreened recyclable debris material which comprises:
   conveying undesirable material-containing debris material along a conveyor path;
   agitating the undesirable material-containing debris material at a first position along the conveyor belt and thereby producing a rearrangement of the debris material with the undesirable material urged to the top of the conveyed material;
   providing a suction tube adapted to direct suction substantially across the width of the debris material in spaced relation over the conveyor following agitation and selectively adjusting the spaced relation for discriminate suction drawing off of the undesirable material with minimal drawing off of the desirable debris material.

8. A device for removing undesired material from recycled material comprising:
   a suction tube, coupled to a vacuum source, the suction tube having an open end adapted to direct a continuous suction substantially across the width of a stream of conveyed recycled material and that overlies the stream of conveyed recycled material which includes pieces of undesired material;
   an agitating mechanism adapted to agitate the stream of conveyed recycled material at a position prior to the position of the open end of the tube; and
   wherein the stream of conveyed recycled material is conveyed by an endless belt conveyor adapted to convey material and the agitating mechanism is a rotor having radially projecting members, said rotor positioned under the belt and the projecting members engaging the belt during rotation for repetitively bouncing material conveyed on the belt to cause lighter material to become positioned on the top of the material being conveyed.

9. The device as defined in claim 8 including an adjustable mounting for mounting the open end of the tube in spaced relation above the stream of conveyed recycled material, said mounting including an adjustment for selectively adjusting the relative position of the open end of the tube; and
   wherein the stream of conveyed recycled material has been preground and/or prescreened, and the adjustment is configured for manual adjustment by an operator visually observing the suction effect of the suction tube on the material being conveyed by the conveyor belt.

* * * * *